H. N. OTT AND F. H. BUFTON.
PROJECTION APPARATUS.
APPLICATION FILED NOV. 13, 1919.

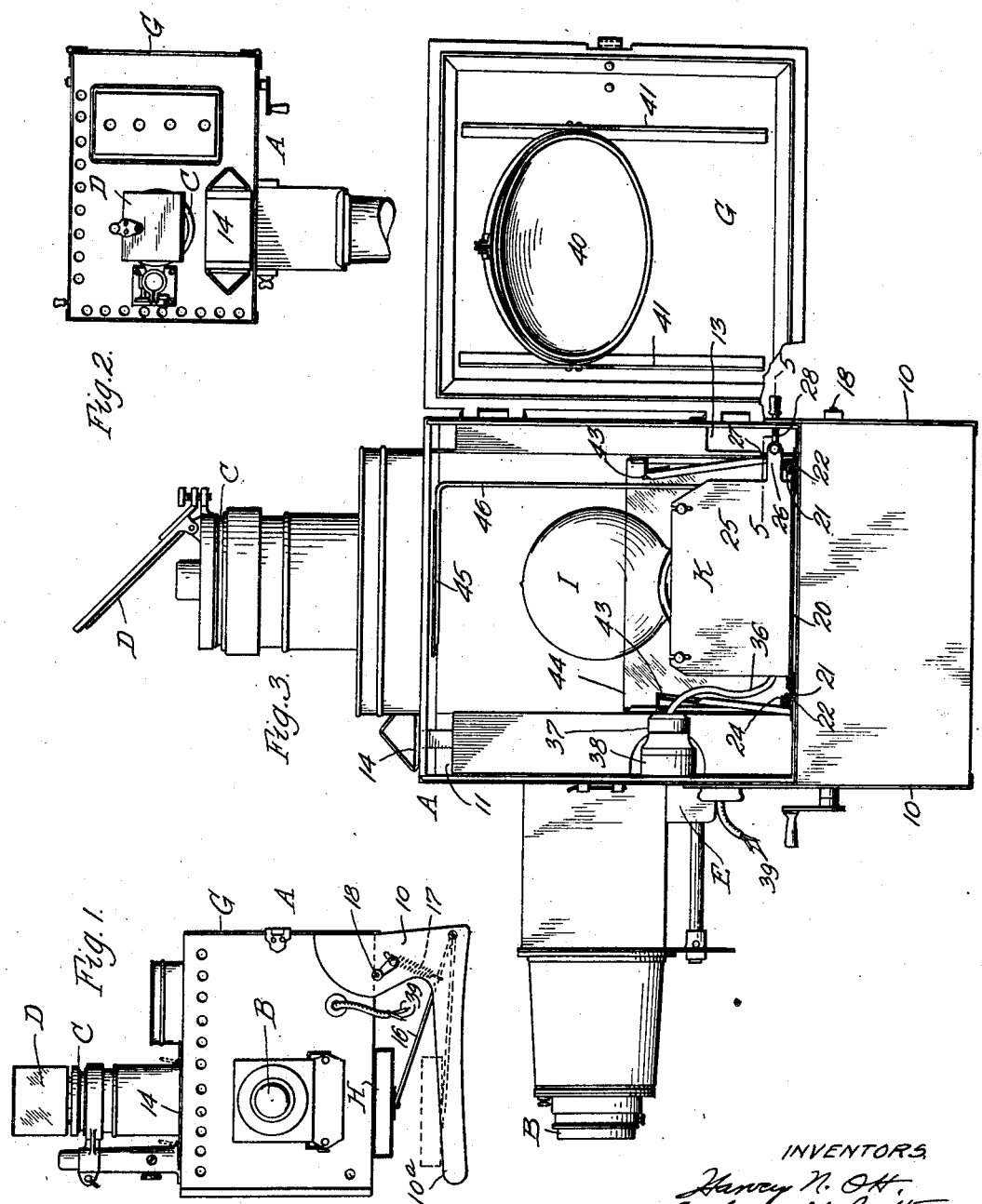

1,408,027.

Patented Feb. 28, 1922.
3 SHEETS—SHEET 2.

INVENTORS
Harvey N. Ott
and Frank H. Bufton.
By Parker & Prochura
ATTORNEYS.

H. N. OTT AND F. H. BUFTON.
PROJECTION APPARATUS.
APPLICATION FILED NOV. 13, 1919.
1,408,027.
Patented Feb. 28, 1922.
3 SHEETS—SHEET 3.
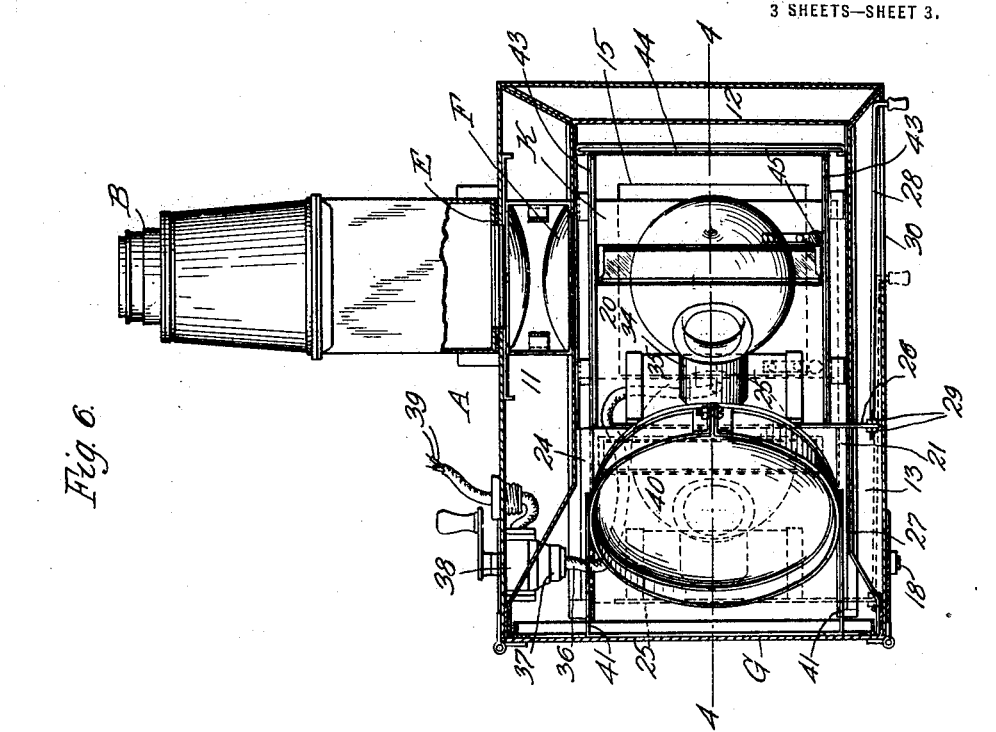
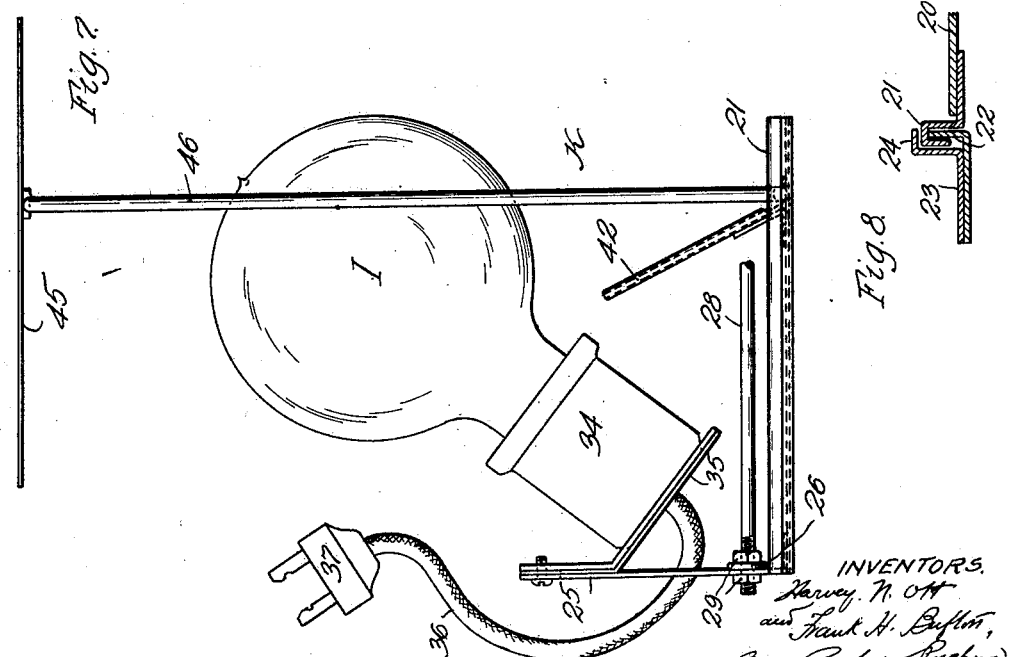
INVENTORS.
Harvey N. Ott
and Frank H. Bufton,
by Parker & Krochun
ATTORNEYS.

UNITED STATES PATENT OFFICE.

HARVEY N. OTT AND FRANK H. BUFTON, OF BUFFALO, NEW YORK, ASSIGNORS TO SPENCER LENS CO., OF BUFFALO, NEW YORK.

PROJECTION APPARATUS.

1,408,027. Specification of Letters Patent. Patented Feb. 28, 1922.

Application filed November 13, 1919. Serial No. 337,773.

*To all whom it may concern:*

Be it known that we, HARVEY N. OTT and FRANK H. BUFTON, citizens of the United States, residing at Buffalo, in the county of Erie and State of New York, have invented a new and useful Improvement in Projection Apparatus, of which the following is a specification.

This invention relates to projection apparatus of the sort used for projecting images from either transparent lantern slides or objects and opaque objects, such for instance, as post cards, books and the like.

More particularly the invention relates to projection apparatus of this type in which the lamp or illuminating device is arranged to move from one position in which it illuminates the transparent objects to another position in which it illuminates the opaque objects.

One object of the invention is to produce a projection apparatus of desirable and practical but very simple and inexpensive construction in which the lamp or other illuminating device is slidably mounted in the casing and can be readily actuated from the outside of the casing by a single movement in one direction or the other to place the lamp in its proper operative position for illuminating either a transparent object or an opaque object.

Another object is to so construct the apparatus that it will be particularly adapted for accomplishing the above result, and to mount the reflector for the lamp on a door or one of the walls of the casing, which door or wall is movable to permit access to the reflector and to the lamp and its carriage or slide.

Other objects are to provide a shield which is movable with the lamp carriage to obstruct the light rays to the opaque projection objective when the transparent objective is being used; and to improve apparatus of this sort in the other respects hereinafter described and claimed.

In the accompanying drawings:

Fig. 1 is a front elevation of a projection apparatus embodying the invention.

Fig. 2 is a fragmentary plan view thereof.

Fig. 3 is a side elevation of the apparatus, on an enlarged scale with the door open to disclose the lamp and its carriage.

Fig. 6 is a sectional plan view of the apparatus on line 6—6 Fig. 4, but with parts thereof in a different position.

Fig. 7 is a side elevation, enlarged, of the lamp carriage removed from the apparatus.

Fig. 8 is a cross section, on an enlarged scale, of one of the guides for the lamp carriage.

Figure 4:
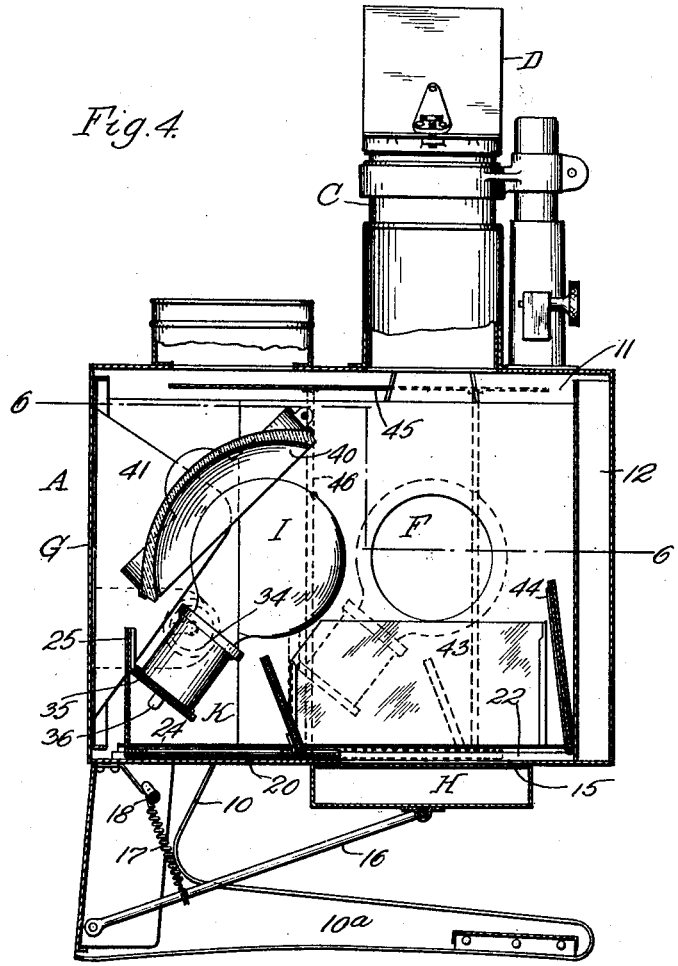
Fig. 4 is a transverse sectional elevation of the apparatus on line 4—4 Fig. 6.

A represents the casing or light chamber of the apparatus, which may be of any suitable construction. It is preferably made of sheet metal, and has supporting legs 10 at one side thereof which are provided with lateral feet or rests $10^a$ which extend under the casing as shown in Figs. 1 and 4 for supporting the apparatus. B represents the objective for the transparent lantern slides or objects. C represents the opaque projection objective. As shown the objective B for the lantern slides is arranged at the front end of the casing and the other objective C at the top of the casing with its axis preferably in the same vertical plane as the horizontal axis of the objective B. D is an inclined mirror or reflector for directing the image forwardly from the objective C to the screen. The objective B has associated therewith as usual, suitable means E for supporting the lantern slides, and a condensing unit F. The casing A is preferably provided with double walls forming air spaces 11, 12 and 13 for keeping the outer surface cool, and with a hinged door or wall G at one side of the casing. The condensing unit F is conveniently located in the space 11 and is suspended from a removable cover or plate 14 which closes an opening in the top of the casing through which the condenser can be readily inserted and removed by means of the cover plate. A movable object holder is provided for holding the opaque objects beneath an exposure opening 15 in the bottom of the casing. The holder includes a table or support H pivotally connected to the ends of swinging arms or rods 16, hinged to the base or legs of the apparatus. The table is adapted to be moved downwardly away from the exposure opening to a position where the post card, book or other opaque object may be conveniently placed and adjusted on the holder which is then returned to its operative position beneath the exposure opening 15. The table is preferably returned to and normally held in its raised operative position by a spring 17 attached to the arms 16 and to a cranked or bent operating shaft 18. When this shaft is in the position shown in the drawings, the spring is under tension and will hold the table in the raised position shown and return it to such position when the table is released after lowering it. By turning the operating shaft the spring will be relieved of tension and will allow the table to drop and remain in its lowered position until the crank shaft is again turned to place the spring under tension. The table can be raised and lowered either by turning the crank shaft 18, in this way, or by taking hold of the table or supporting arms, in which latter case however, the spring will remain under tension and raise the table when it is released after lowering it. This object support is not claimed in this application but forms the subject of another application, Serial No. 441,126 filed Jan. 31, 1921. While the apparatus as thus far described is preferably constructed as shown and above explained, it may be of other suitable construction.

I represents an incandescent electric lamp or other suitable source of light for illuminating the transparent lantern slides or the opaque objects.

Figure 5:
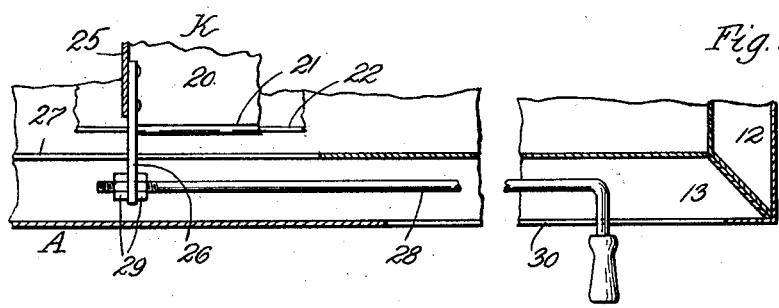
Fig. 5 is a fragmentary horizontal section on a still larger scale on line 5—5 Fig. 3.

As shown in the drawings, the objectives B and C and the exposure opening 15 are all arranged in a common longitudinal vertical plane near one side of the casing A, and the lamp I is adapted to be moved in the casing transversely of the apparatus to place it in one operative position, shown in Fig. 6 and by broken lines in Fig. 4, to illuminate a transparent object and project the image through the objective B and to place it in another operative position shown by full lines in Fig. 4 to illuminate an opaque object in the exposure opening 15 and project the image through the other objective C. In the first position the lamp is directly opposite and close to the objective B and the lantern slide where it will act to best advantage by direct illumination, and in the second position the lamp is close to and adapted to brilliantly illuminate the opaque object. For thus moving the lamp it is preferably mounted on a slide or carriage K constructed and arranged as follows: The carriage is adapted to slide transversely of the apparatus so that the lamp may assume either of the two operative positions before mentioned. The carriage K (see Fig. 7) may be of any suitable construction but preferably comprises a horizontal metal plate 20 provided at its opposite edges with bent flanges forming guide grooves 21 which embrace and are adapted to slide on parallel guide rails or flanges 22 secured on and extending transversely of the bottom of the casing A. Retaining strips 23 are also secured to the bottom of the casing, and are provided with inwardly extending flanges 24 which overhang the guide grooves 21 of the carriage to prevent displacement thereof. The means for actuating the carriage K to move the lamp from one operative position to the other in the casing are preferably of the following construction: A vertical end plate 25 secured to one end of the carriage K is provided with a rearwardly extending arm or part 26 which preferably projects into the space 13 through a slot or opening 27 in the inner wall of the casing. A horizontal rod 28 (see Figs. 5, 6 and 7) extends transversely of the apparatus in the space 13 and has one of its ends secured to the arm 26 by nuts or the like 29. The opposite end of the rod 28 is bent outwardly or rearwardly and extends through a horizontal slot 30 in the outer rear wall of the casing and is provided with a suitable handle for operating the slide. In Fig. 4 the lamp I and carriage K are shown in a position to illuminate an opaque object and in Fig. 6 the lamp and carriage are in a position opposite the projection objective B for illuminating the transparent lantern slides or objects. This last mentioned position is determined by the location of the right hand end of the slot 27 (Fig. 6) which forms a stop which is engaged by the arm 26 to limit the movement of the carriage K in that direction. The movement of the carriage K in the opposite direction is determined by the engagement of the handle part of the rod 28 which engages the left hand end of the slot 30, as shown by dotted lines in Fig. 6. The sliding lamp carriage could be constructed and slidably mounted in the casing in any other suitable manner.

The lamp I may be mounted on the carriage K and connected to the source of current in any suitable way. As shown in the drawings, the lamp is screwed or otherwise removably seated in a lamp socket 34 secured to an inclined bracket 35 which is adjustably mounted on the end plate 25 of the carriage so that the lamp I may be properly centered as regards the axes of the projection objectives B and C. A flexible conductor cord 36 having a detachable contact plug 37 adapted to snap into a complementary contact socket 38 on the wall of the casing provides the connecting means with the necessary supply circuit conductors 39.

40 represents a mirror preferably having a concave spherical reflecting surface, substantially concentric with the source of light and adapted to reflect the light rays downwardly onto the opaque object or post card in the exposure opening. This mirror 40 is preferably mounted in any suitable manner in an inclined position on the door G, brackets 41 being shown in the drawings for this purpose. When the door G is opened the mirror swings with it away from its operative position over the lamp, as indicated in Fig. 3. This construction therefore enables the mirror to be readily cleaned by opening the door to the position shown in Fig. 3 and also permits the lamp and carriage to be readily accessible for cleaning, changing or adjusting the lamps. The carriage K may also be removed from the casing if necessary, by removing the outer nut 29. The carriage can then be withdrawn through the door opening. A mirror 42 supported on the carriage K is adapted, when the carriage is in the position shown in Fig. 4 to cooperate with mirrors 43 and 44 at the remaining sides of the exposure opening 15 to concentrate the light rays on the opaque object. When the lamp I and carriage K are in position for illuminating transparent lantern slides as shown on dotted lines Fig. 4, it is necessary to shield the opaque objective from light rays.

The means shown for accomplishing this result preferably comprises a guard or shield 45 which may be a sheet metal plate, and is attached to the forwardly bent upper end of a vertical rod or post 46 secured to the carriage. Thus when the carriage is moved to the right as explained, the shield will be moved beneath, and obstruct the opening for the opaque objective C in the top of the casing A. The shield is however entirely out of the way when the carriage and lamp are moved to illuminate opaque objects. Any other suitable means may be provided for shielding the opaque objective C.

When using the apparatus the operator faces the right hand end thereof as seen in Fig. 4, so that the left hand may readily operate the lamp carriage by a simple movement in one direction or the other to change from transparent to opaque projection. In this position the right hand may be readily used to actuate the crank shaft 18 of the opaque object holder and the construction of the supporting legs 10 permits unobstructed access to the opaque object holder for arranging the object thereon.

The described construction provides an exceedingly simple and practical means for accomplishing the results desired and the relative locations of the handles for the lamp carriage and for the object holder are such that the operator may manipulate the apparatus in the most convenient and comfortable manner, and without having to reach around or over the casing.

We claim as our invention:

1. In a projection apparatus, the combination of a light casing, a transparent projection objective, an opaque projection objective, means for holding a transparent object and an opaque object in operative relations to said respective objectives, and a source of light movable in a direction transverse to the planes of the axes of said objectives from a position for illuminating one of said objects to a position for illuminating said other object.

2. In a projection apparatus, the combination of a light casing, a transparent projection objective, an opaque projection objective, means for holding a transparent object and an opaque object in operative relations to said respective objectives, and a source of light movable in a direction transverse to the planes of the axes of said objectives from a position in line with one of said objectives to a position in which it illuminates said opaque object.

3. In a projection apparatus, the combination of a light casing, a transparent projection objective and an opaque projection objective, a holder for a transparent object, a holder for an opaque object, and a source of light movable in a straight line transverse to the axes of said objectives from a position in which it illuminates one of said objects to a position in which it illuminates said other object.

4. In a projection apparatus, the combination of a light casing, a transparent projection objective and an opaque projection objective, a holder for a transparent object, a holder for an opaque object, and a source of light movable in a straight line transverse to the axes of said objectives from a position in which it is in axial alinement with one of said projection objectives and illuminates one of said objects, to a position out of said axial alinement with said projection objective and in which it illuminates said other object.

5. In a projection apparatus, the combination of a light casing, a transparent projection objective and an opaque projection objective, a holder for a transparent object, a holder for an opaque object, said projection objectives being disposed in the same plane, and a source of light movable from a position in said plane in which it illuminates one of said objects, to a position out of said plane in which it illuminates said other object.

6. In a projection apparatus, the combination of a light casing, a transparent projection objective and an opaque projection objective, a holder for a transparent object, a holder for an opaque object, said projection objectives being disposed in the same plane, and a source of light movable transversely to said plane from a position in which it illuminates one of said objects, to a position in which it illuminates said other object.

7. In a projection apparatus, the combination of a light casing, a transparent projection objective and an opaque projection objective, a holder for a transparent object, a holder for an opaque object, said projection objectives being disposed in the same plane, and a source of light movable transversely to said plane from a position in said plane and in which it illuminates one of said objects, to a position at one side of said plane and in which it illuminates said other object.

8. In a projection apparatus, the combination of a light casing, a transparent projection objective and an opaque projection objective, a holder for a transparent object, a holder for an opaque object, a reflector, and a source of light movable from a position adjacent said reflector and in which it illuminates one of said objects, to a position remote from said reflector and in which it illuminates said other object.

9. In a projection apparatus, the combination of a light casing, a transparent projection objective and an opaque projection objective, a holder for a transparent object, a holder for an opaque object, a reflector, and a source of light movable from a position in which it is in axial alinement with said projection objectives and remote from said reflector and in which it illuminates one of said objects, to a position out of said axial alinement and adjacent said reflector and in which it illuminates said other object.

10. In a projection apparatus, the combination of a light casing, a transparent projection objective and an opaque projection objective, a holder for a transparent object, a holder for an opaque object, said projection objectives being disposed in the same plane, a reflector, and a source of light movable from a position adjacent said reflector and in which it illuminates one of said objects, to a position remote from said reflector and in which it illuminates said other object.

11. In a projection apparatus, the combination of a light casing, a transparent projection objective and an opaque projection objective, a holder for a transparent object, a holder for an opaque object, a reflector, and a source of light movable in a direction transverse to the axes of said projection objectives from a position adjacent said reflector and in which it illuminates one of said objects, to a position remote from said reflector and in which it illuminates said other object.

12. In a projection apparatus, the combination of a light casing, a transparent projection objective and an opaque projection objective, a holder for a transparent object, a holder for a opaque object, said projection objectives being disposed in the same plane, a reflector, and a source of light movable in a direction transverse to said plane of said projection objectives from a position adjacent said reflector and in which it illuminates one of said objects, to a position remote from said reflector and in which it illuminates said other object.

13. In a projection apparatus, the combination of a light casing, a transparent projection objective and an opaque projection objective, a holder for a transparent object, a holder for an opaque object, a reflector, a source of light movable from a position adjacent said reflector and in which it illuminates one of said objects to project an image thereof through one of said projection objectives, to a position remote from said reflector and in which it illuminates said other object to project an image thereof through said other projection objective, and a shield for obstructing the light rays to one of said projection objectives when an image is being projected through said other objective.

14. In a projection apparatus, the combination of a light casing, a transparent projection objective and an opaque projection objective, a holder for a transparent object, a holder for an opaque object, a reflector, a source of light movable from a position adjacent said reflector and in which it illuminates one of said objects to project an image thereof through one of said projection objectives, to a position remote from said reflector and in which it illuminates said other object to project an image thereof through said other projection objective, and a shield movable with said source of light for obstructing the light rays to one of said projection objectives when an image is being projected through said other objective.

15. In a projection apparatus, the combination of a light casing, a transparent projection objective and an opaque projection objective, a holder for a transparent object, a holder for an opaque object, a reflector, a source of light movable in a direction transverse to the axes of said projection objectives from a position adjacent said reflector and in which it illuminates one of said objects to project an image thereof through one of said projection objectives, to a position remote from said reflector and in which it illuminates said other object to project an image thereof through said other projection objective, and a shield for obstructing the light rays to one of said projection objectives when an image is being projected through said other objective.

16. In a projection apparatus, the combination of a light casing, a transparent projection objective and an opaque projection objective, a holder for a transparent object, a holder for an opaque object, a reflector, a source of light movable in a direction transverse to the axes of said projection objectives from a position adjacent said reflector and in which it illuminates one of said objects to project an image thereof through one of said projection objectives, to a position remote from said reflector and in which it illuminates said other object to project an image thereof through said other projection objective, and a shield movable with said source of light for obstructing the light rays to one of said projection objectives when an image is being projected through said other objective.

17. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, and means for moving said source of light in a horizontal path from a position in which it illuminates one of said objects, to a position in which it illuminates said other object.

18. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable to different places in said casing to shift said source of light from a position in which one of said objects is illuminated to a position in which said other object is illuminated.

19. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable to different places in said casing to shift said source of light from a position in which one of said objects is illuminated to a position in which said other object is illuminated, and means outside of said casing by which said slide may be moved.

20. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable transversely of the apparatus to shift said source of light from a position in which one of said objects is illuminated to a position in which said other object is illuminated.

21. In a projection apparatus, the combination of a light casing, a holder for supporting an opaque object, in the bottom of said casing, a holder for supporting a transparent object at one side of said casing, a projection objective in the upper part of said casing, a second projection objective at one side of said casing, a source of light in said casing, and means for moving said source of light in a horizontal path from a position in which it illuminates one of said objects, to project an image thereof through one of said projection objectives, to a position in which it illuminates said other object to project an image thereof through said other projection objective, and means for shielding one of said objectives when an image is being projected through said other objective.

22. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable to and from different places in said casing to shift said source of light from a position in which one of said objects is illuminated to a position in which said other object is illuminated, means outside of said casing by which said slide may be moved, and a part on said slide projecting outwardly through an aperture in said casing by which said slide may be moved.

23. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable to and from different places in said casing to shift said source of light from a position in which one of said objects is illuminated to a position in which said other object is illuminated, means outside of said casing by which said slide may be moved, stops on said casing, and a part on said slide projecting outwardly through said casing by which said slide may be moved, and which engages said stops to limit the movement of said slide.

24. In a projection apparatus, the combination of a light casing, a holder for supporting an opaque object in the bottom of said casing, a holder for supporting a transparent object at one side of said casing, a projection objective in the upper part of said casing, a second projection objective at one side of said casing, a source of light in said casing, a slide in said casing on which said source of light is mounted, and which is movable to shift said source of light from a position in which one of said objects is illuminated to project an image thereof through one of said objectives, to a position in which said other object is illuminated to project an image thereof through said other objective, and a shield carried by said slide and movable to completely obstruct one of said objectives when an image is being projected through said other objective.

25. In a projection apparatus, the combination of a light casing, a transparent projection objective and an opaque projection objective, a holder for a transparent object, a holder for an opaque object, said casing having a movable part, a reflector secured on said movable part of said casing, a source of light movable from a position in which it illuminates one of said objects, to a position in which it illuminates said other object, and said reflector being movable with said casing part to a position in which said reflector and said source of light are accessible from the exterior of said casing.

26. In a projection apparatus, the combination of a light casing, a part on said casing being hinged and adapted to swing outwardly, a transparent projection objective and an opaque projection objective, a holder for a transparent object, a holder for an opaque object, a reflector on said hinged part of said casing, a source of light in said casing movable from a position in which it illuminates one of said objects, to a position in which it illuminates said other object, and said reflector being adapted to swing outwardly with said hinged part of said casing to afford access to said reflector and said source of light.

Witness our hands this 11th day of November, 1919.

HARVEY N. OTT.
FRANK H. BUFTON.

Witnesses:
ISABEL FAIRBERN,
EDWARD E. FROST.